United States Patent [19]
Brooks

[11] Patent Number: 4,457,195
[45] Date of Patent: Jul. 3, 1984

[54] AUTOMATIC STRIP CUTTING MACHINE
[75] Inventor: Dannie L. Brooks, Red Lion, Pa.
[73] Assignee: Reel-O-Matic Systems, Inc., Wrightsville, Pa.
[21] Appl. No.: 378,949
[22] Filed: May 17, 1982
[51] Int. Cl.³ .............................................. B23D 45/04
[52] U.S. Cl. .................................... 83/69; 51/99; 83/157; 83/208; 83/210; 83/212; 83/263; 83/490; 83/649
[58] Field of Search .................... 83/208–210, 83/212, 157, 69, 649, 490, 448, 236, 263, 264; 51/99; 242/48, 47.5, 47.01, 189–191

[56] References Cited
U.S. PATENT DOCUMENTS

| 1,288,402 | 12/1918 | Gale, Sr. | 83/157 |
| 1,846,811 | 2/1932 | Link | 83/649 X |
| 2,351,962 | 6/1944 | Harrison | 83/157 |
| 2,374,806 | 5/1945 | Cicchetti et al. | 83/490 X |
| 3,213,726 | 10/1965 | Logan et al. | 83/236 X |
| 3,523,392 | 8/1970 | Carl | 83/208 X |
| 3,654,830 | 4/1972 | Werner, Jr. | 83/208 |
| 3,759,124 | 9/1973 | Bashor | 83/157 X |
| 3,830,125 | 8/1974 | Carmien | 83/212 |
| 4,095,497 | 6/1978 | Radford et al. | 83/157 |
| 4,256,427 | 3/1981 | Patel | 83/157 X |
| 4,406,251 | 9/1983 | Neri et al. | 83/236 X |

Primary Examiner—Frank T. Yost
Attorney, Agent, or Firm—Edwin E. Greigg

[57] ABSTRACT

The invention disclosed relates to cutters for automatically cutting strips of material such as wire rope, electrical cable, or any other desired cylindrical, linear material. The apparatus proposed is best suited for cutting wire rope having a diameter of from ¼ inch to about 1 inch. The cutting apparatus includes a controlled turntable upon which a roll of wire rope is mounted, the wire rope is directed through the tubular guide into two oppositely disposed rollers which are adjusted to size for feeding the wire to a cutter. Adjacent the cutter a V-groove platform is provided in which the wire rope lays during cutting. The V-groove is formed by adjacent doorsections that pivot to permit the cut piece to fall through the opened doors to a container below the table. The apparatus is provided with a suitable electrical circuit for operating the cutter motor, the grip roller, the turntable and controls for movement of the cutter and opening the V-groove doors. A switch arrangement is provided to operate a counter for counting the number of pieces as well as for operation of all other operational parts.

5 Claims, 6 Drawing Figures

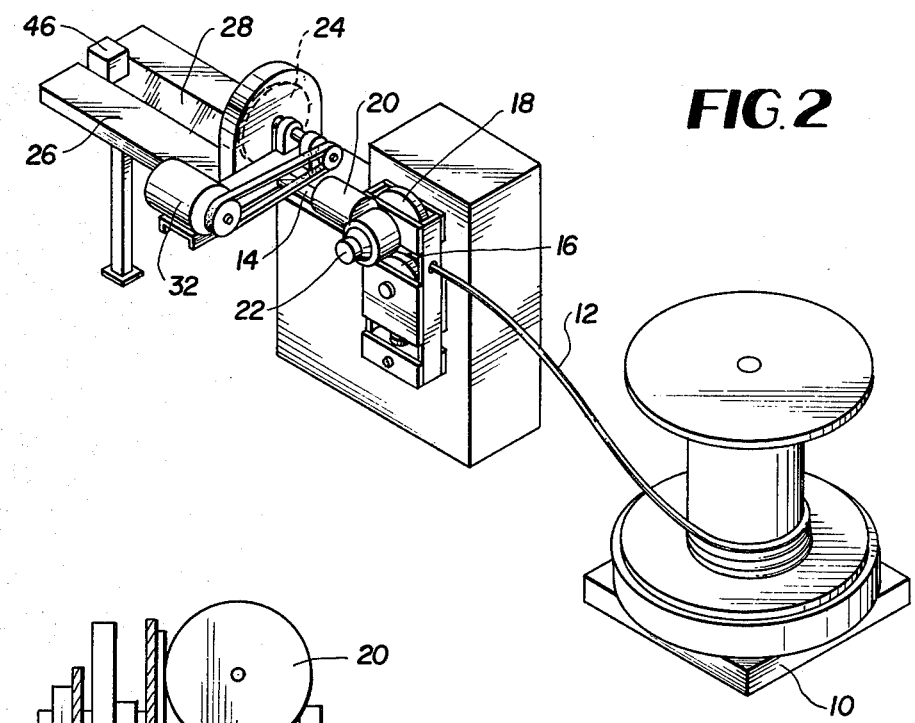
FIG. 2
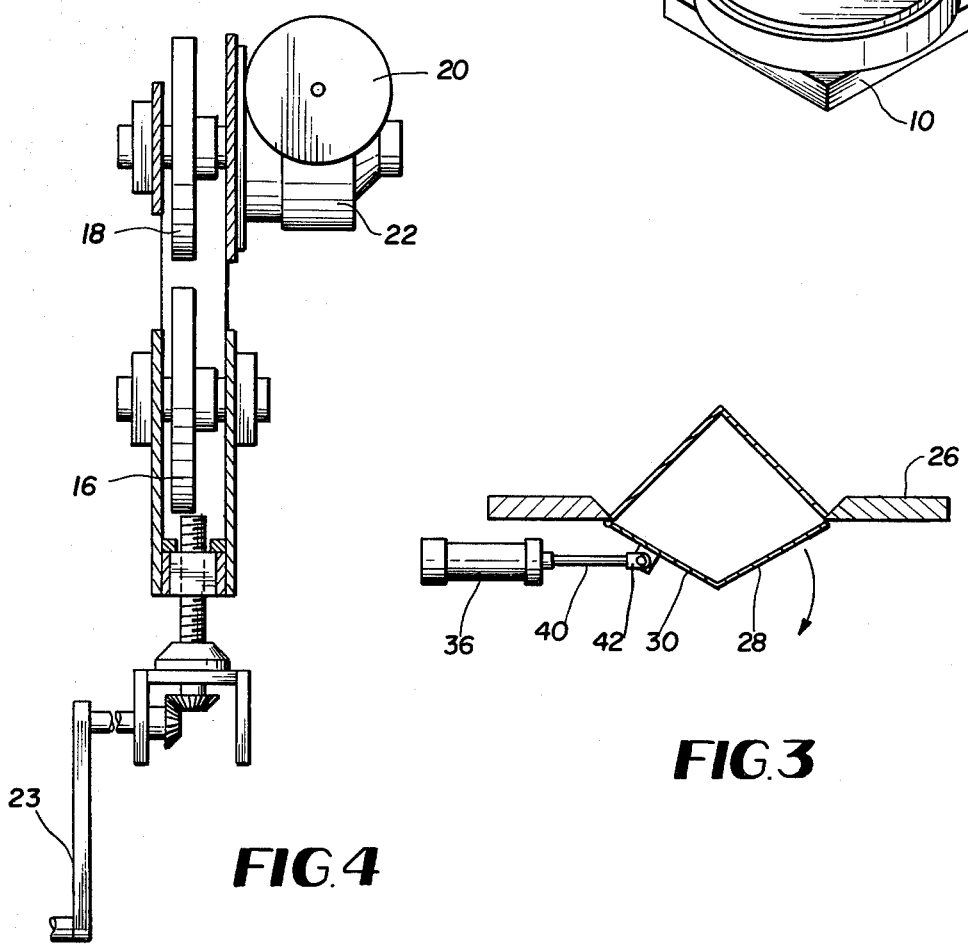
FIG. 3
FIG. 4

AUTOMATIC STRIP CUTTING MACHINE

The present invention relates to cutters and more particularly to a machine for accurately cutting pieces of material the same length and depositing the cut pieces into a holder.

Heretofore cutting machines have been used for cutting pieces of material of different types. Strip cutters have been used in which the strips are cut during continuous movement of the strip, cut while the strip is completely stopped and machines that stop the movement of the material by use of the cutter while cutting is performed. Such cutter machines have been shown in U.S. Pat. Nos. 3,757,552 and 3,978,703. Such prior art cutters do not provide a guide tube nor do they provide a cutting surface on each side of the cutter for more accurately cutting straight smooth cuts.

SUMMARY OF THE INVENTION

This invention is directed to a cutter for automatically cutting strips of material such as wire rope, electrical cable, or any other desired cylindrical, linear material. The machine is best suited for cutting wire rope and having a diameter of from ¼ inch to about 1 inch. The cutting machine includes a controlled turntable upon which a roll of wire rope is mounted, the wire rope is directed through the tubular guide into two oppositely disposed rollers which are adjusted to size for feeding the wire to a cutter. Adjacent the cutter is found a V-groove platform in which the wire rope lays during cutting. The V-groove is formed by adjacent doorsections that pivot to permit the cut piece to fall through the opened doors to a container below the table. The machine is provided with a suitable electrical circuit for operating the cutter motor, the grip roller, the turntable and controls for movement of the cutter and opening the V-groove doors. The switch arrangement operates a counter for counting the number of pieces as well as for operation of all other operational parts.

It is therefore an object to provide a wire rope cutting machine which will make smooth even cuts of desired length.

Another object is to provide a support for cutting desired lengths of rope wherein the support opens to drop the cut piece into a container.

Still another object is to provide a guide for guiding the wire rope to the feed rollers prior to cutting.

Yet another object is to provide a cutting machine which controls the feed speed of the material to be cut so that each piece will be of uniform length.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is a back-side view illustrating the elemental parts of the cutting machine.

FIG. 3 illustrates a control cylinder and piston for opening and closing doors of a V-trough, FIG. 4 illustrates a more detailed view of the drive wheels the drive motor and the reduction gear housing.

DETAILED DESCRIPTION OF THE PREFERRED EMBODIMENTS

Figure 1:
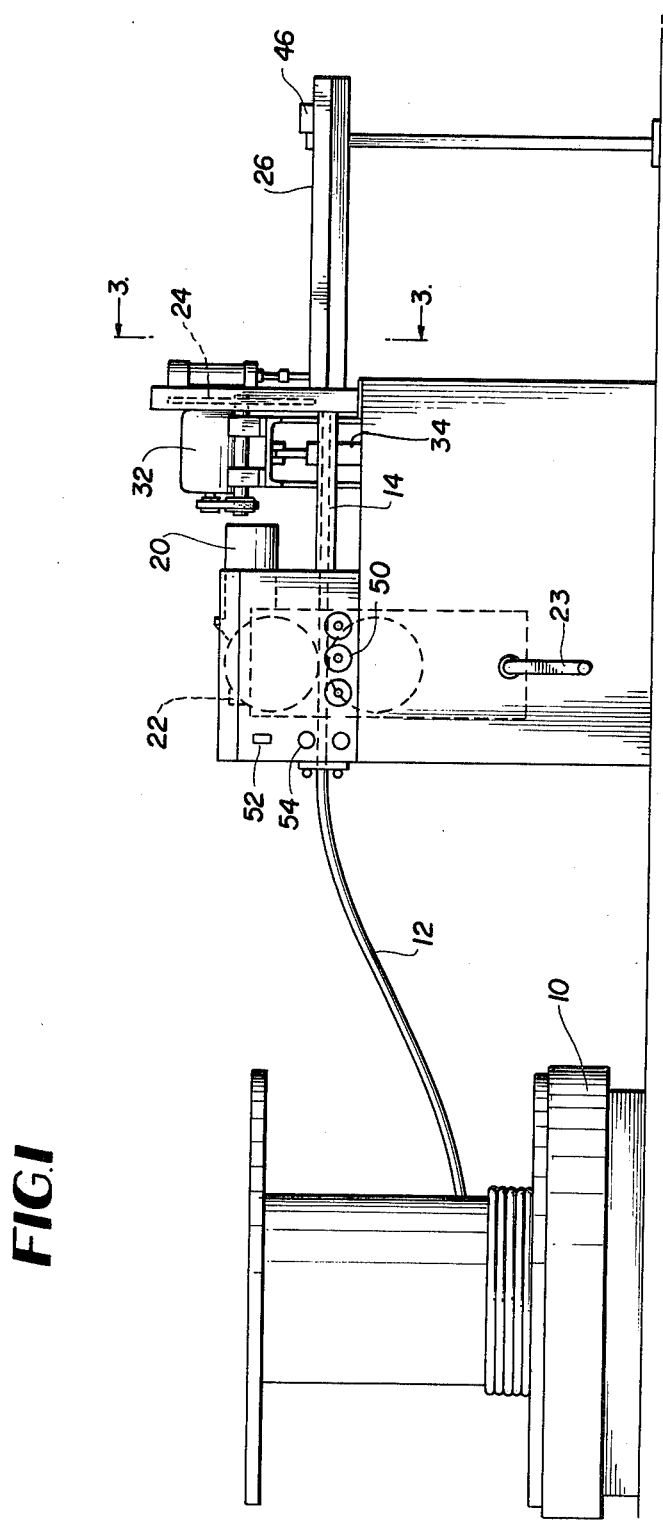
FIG. 1 is a side view which illustrates the relative parts including a control panel.

Now referring to the drawing there is shown in FIGS. 1 and 2 a cutter machine including a motor driven tensioned controlled payoff turntable 10 upon which a reel of rope wire 12 or other suitable material is positioned for rotation with the pay off turntable. The wire rope is fed through a guide tube 14 positioned in a horizontal plane which is positioned adjacent rollers 16 and 18 which are secured with their axis in a horizontal line and aligned vertically between which the wire rope is fed. The rollers have contoured concave surfaces in which the concave curvature is sufficient for passing wire rope of a desired diameter range such as from ¼ inch to an inch. Roller 16 is a freely rotatable roller whereas roller 18 is driven by a variable speed motor 20 through a reduction gear 22. The freely rotatable roller is adjustable vertically for different sized rope by a hand operated adjusting means 23 which may be provided with a strong spring under tension which forces the roller 16 toward the driven roller 18. The rope is fed directly from between the rollers 16 and 18 to a motor driven cutter 24 and onto a support table 26 which has a V-shaped trough including doors 28 and 30 that opens in order to drop the cut pieces into a container (not shown) below the table.

The cutter is driven by a high powered motor 32 such as a 5 horse power, 220 Volt motor. The motor and cutter are mounted such that they can be moved vertically together as an assembly across the wire rope 12 to be cut by use of a fluid or air operated cylinder 34 which includes piston 35 and is electrically controlled by an electrically controlled valve 31.

The door sections 28 and 30 of the V-shaped trough are connected along one linear edge to the table by use of hinges which permit the door to open downwardly. The door of the V-shaped trough is operated by a fluid or air operated cylinder 36 which includes a piston therein with a piston rod 40 extending therefrom which connects with a pivotable connector 42 which is pivotably connected to the door. As the piston is forced inwardly within the cylinder by the fluid or air pressure which is controlled by an electrically controlled valve 31 as shown for cylinder 34, the mechanical levers force the doors open thereby dropping the cut piece into a container. The fluid cylinder 36 is controlled by a timer operated switch which is activated by the cutter assembly at its down position subsequent to cutting the piece of wire rope. The time switch activates the fluid or air cylinder control switch which controls a fluid or air valve which in turn controls the fluid or air flow to the cylinder 36 which functions to open the doors. After a set time which is sufficient for the cut piece to drop from the V-groove, the timer changes the control valve in order to control the fluid or air flow for closing the doors. The same timer switch controls the motor - cutter assembly in order to operate the control switch for the fluid cylinder 34 which raises the motor - cutter assembly the next cut.

The cutting machine is provided with an adjustable end stop 46 at the far end of the table which is adjustable toward and from the motor - cutter assembly for the different lengths of pieces to be cut. The end stop is provided with a stop switch that controls relay switches that opens the electrical circuit to the wheel drive motor 20 which prevents further movement of the wire rope onto the table. The system may be provided with a stop counter, a set slow down counter and a batch counter of a well-known type such as a Durant Solid State Series 1900 2-level counter purchased from Durant Counters and Controls, Watertown, Wis. 53094. The set slow down counter control controls the speed of the motor 20 which changes the motor speed from fast to slow. By changing the speed of the motor to slow, the run-speed of the wire to be cut is controlled so that the set stop counter control can control the length of wire to be cut and then the wire will not strike the stop switch with a great force if a stop switch is used. An automatic batch counter is provided to count the number of pieces. The counter can be set for automatic control for a complete shut-down after a desired number of cuts or for continuous operation.

The length of the piece of material to be cut frm the wire rope may be determined by the set stop counter or by a micro-switch secured to the movable end piece 46 of the table which is adjustable along the V-trough of the table bed. If a micro-switch is used to control the length of the cut piece, the stop counter is adjusted for a run just longer than that required so that the wire rope will be fed to contact the micro-switch.

Figure 5A:
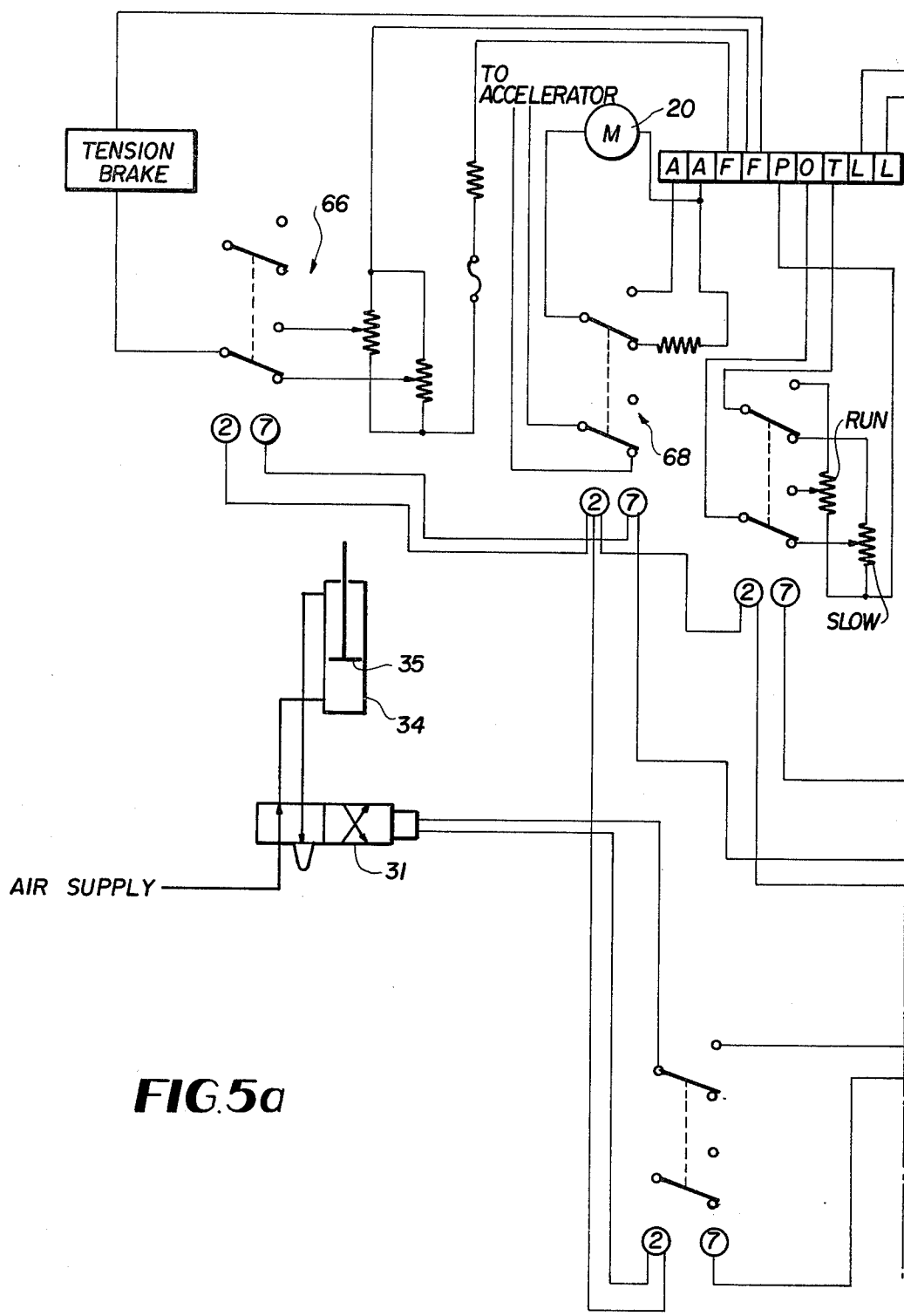
FIGS. 5a and 5b are a schematic view of a wiring diagram for operation of the various electrical parts of the cutter system.
Figure 5B:
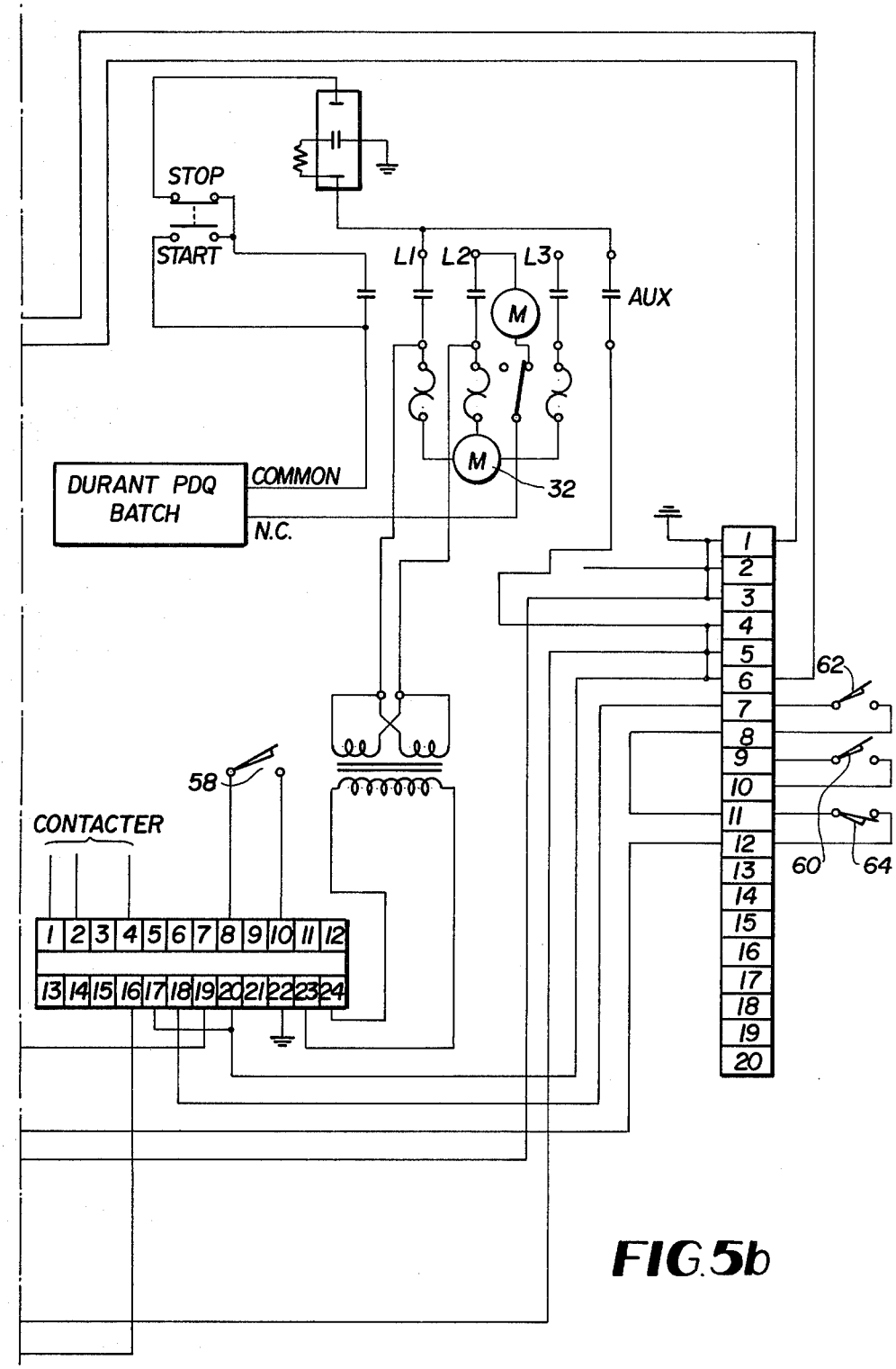

FIGS. 5a and 5b illustrate a schematic diagram of an electrical circuit which may be used for controlling the operative elements such as the relays, fluid or air switches, motor, etc.

OPERATION

In carrying out the operation, the material to be cut such as wire rope, electrical conductors, tubing (metal and plastic), etc. is placed onto the payout table. The end of the material is inserted into the guide tube and through the guide feed rollers and up to the cutter blade. The guide rollers are adjusted by use of a hand rotated wheel 23 below the control panel such that the material is pinched between the rollers and will be moved by the rollers as they are rotated. A firm grip by the rollers on the wire rope is required. The set control stop is adjusted for the desired length to be cut. The batch counter is set for the total quantity of pieces desired to be cut. The power switch 52 is closed and a glow light may be provided to indicate that the main power is on. The start button 54 is closed; if the batch counter is set for a desired quantity of pieces the batch switch must be closed which will start the operation. The tension for the turn table 10 should be adjusted by use of a hand knob 50 until the proper amount of back tension is achieved and the stop tension control is adjusted to eliminate over-run between cuts. Once the adjustments have been made the cutting machine is automatic. That is, the controls are set and positioned such that the electrical circuitry is controlled by movement of the movable parts. The cutter saw-motor assembly operates micro-switches 58 and 60 at its bottom downward movement to stop the motor during its upward movement, to control the switch 31 to the fluid or air cylinder piston 36 to open the doors of the trough which drops the cut piece, and to control the switch 31 to the cylinder 34 for raising the motor cutter assembly reaches the top or up position, the cutter motor - assembly operates a normally open control switch 62 which is in series with the end stop switch 64 to control the power to the motor 20 that drives the drive grip rollers 16 and 18 and the motor for the pay out table through relays 66 and 68. The drive roller motor operates at fast speed to feed the wire rope onto the table as the wire rope approaches the end of the length to be cut, the slow down counter switch functions to slow down the drive wheel motor 20 so that the drive wheel motor runs on slow speed thereby feeding the wire rope which stops at the desired length to be cut. The set stop counter then breaks the circuit to the drive motor 20 and the payout motor. The drive motor and payout motor stops and the wire rope is ready for cutting. The end stop counter relay that operates the cutter motor to start the motor and also controls the switch to the cylinder that drive the motor - cutter assembly vertically for cutting the wire rope. The cutter cuts the rope through a vertical movement. Upon reaching the lowest point, the motor - cutter assembly operates a pair of microswitches 58, 60, one to the cylinder control for raising the motor cutter, and to cut the cutter motor off and one to the timer for the cylinder control switch 31 for opening the trough doors 28, 30. The timer for the trough doors functions to open the valve 31 for driving the piston 38 to open the trough doors and after a short period, the switch is changed so that the door cylinder operates to close the doors. The timer operates to turn the current off to the door control cylinder control valve at such time as the doors are closed. Once the motor cutter reaches its topmost position micro-switch 62 is closed, the trough doors are closed, and the operation is ready for the next cycle. The batch counter counts the number of pieces cut and completely turns the system off except for the main circuit. The system may be provided with a control switch that shuts the system down if the wire rope is depleted and no more wire rope is available to be cut.

The above operation has been described using a set stop counter switch without the operation of a stop microswitch for controlling the length of the cutpiece. If an end stop microswitch is used, the end stop counter is adjusted for a slightly longer piece than that which is desired to be cut. Therefore, the wire rope will strike the end stop microswitch just before the control for the set stop counter operates to stop the run and the end stop microswitch will function to control the relay switches to stop the wire rope drive motor 20 and the payout motor. When the end stop microswitch is used, the end stop microswitch overrides the circuit control of the set stop counter.

In carrying out this invention, the motors, the electrical controls, switches, set stop counter, set slow down counter, set batch counter, fluid or air piston and control valves are all well known commercially available parts assembled together in order to carry out the teaching of this invention. Obviously, other electrical circuitry using relays and microswitches could be used for obtaining the same results.

The foregoing relates a preferred exemplary embodiment of the invention, it being understood that other embodiments and variants thereof are possible within the spirit and scope of the invention, the latter being defined by the appended claims.

What is claimed and desired to be secured by Letters Patent of the United States:

1. A machine for cutting desired lengths of a material and depositing the cut length into a container which comprises:

a motor driven tensioned controlled payoff turntable for mounting a reel of material to be cut and for feeding the material off the turntable at a desired feed rate;

a material feeder roller means including adjacent cooperating rollers between which said material to be cut is fed;

guide means between said motor driven tensioned control payoff turntable and said material feeder roller means for guiding said material between said cooperating rollers;

a cutter - motor assembly downstream of said material feeder roller means for cutting said material into desired lengths;

a V-trough table means adjacent said cutter - motor assembly for receiving said material from said material feeder roller means prior to being cut into desired lengths;

said V-trough being hinged to said table for opening subsequent to a desired length of material being cut in order to drop said cut piece into a container below said table;

means for determining a desired length of material to be cut, and first control means for moving said cutter motor assembly vertically for cutting said material into a desired length, a second control means for opening said V-trough to drop said cut piece of material from said V-trough to a container below said V-trough; and control means for operating said motor driven tensioned controlled payoff turntable, said cooperating rollers, said cutter-motor assembly and said first and second control means.

2. A machine as claimed in claim 1, in which:
said means for determining the desired length to be cut is a set stop counter.

3. A machine as claimed in claim 2, which includes:
an end stop microswitch.

4. A machine as claimed in claim 3, in which:
said first and second control means are fluid or air operated cylinders.

5. A machine as claimed in claim 4, which includes:
a set slow down counter and a set batch counter.

* * * * *